United States Patent [19]

Hasegawa

[11] Patent Number: 4,710,833
[45] Date of Patent: Dec. 1, 1987

[54] FLOPPY DISK R/W HEAD ASSEMBLY
[75] Inventor: Tadashi Hasegawa, Koriyama, Japan
[73] Assignee: Mitsubishi Denki Kabushiki Kaisha, Tokyo, Japan
[21] Appl. No.: 805,826
[22] Filed: Dec. 5, 1985
[30] Foreign Application Priority Data Feb. 27, 1985 [JP] Japan .................................. 60-38174

[51] Int. Cl.4 ................................................ G11B 5/54
[52] U.S. Cl. ..................................... 360/105; 360/106
[58] Field of Search .............................. 360/104–106, 360/109

[56] References Cited
U.S. PATENT DOCUMENTS 4,241,366 12/1980 Nishida ................................ 360/105
4,383,283 5/1983 Machut .......................... 360/106 X
4,423,449 12/1983 Hasegawa ........................... 360/106
4,630,155 12/1986 Hasegawa ...................... 360/105 X Primary Examiner—A. J. Heinz
Attorney, Agent, or Firm—Sughrue, Mion, Zinn, Macpeak and Seas

[57] ABSTRACT

Floppy disk transducer heads 5a, 5b are mounted by gimbal springs 6a, 6b to facing sides of a radially movable carriage 9 and a loading arm 7 pivotally mounted to the carriage and biased theretowards by a flexible spring blade 8. An abutment stop 18 upstanding from the carriage engages a lower surface of the loading arm to prevent any further pivoting thereof towards the carriage beyond a position whereat the heads lightly pinch the opposite disk surfaces with a desired tracking force exclusively determined by the gimbal springs.

4 Claims, 6 Drawing Figures

_4,710,833_

FLOPPY DISK R/W HEAD ASSEMBLY

BACKGROUND OF THE INVENTION

1. Field of the Invention

This invention relates to a movable magnetic head assembly employed in double sided flexible magnetic disk storage devices, and in particular to a construction thereof which enables the flexible magnetic disk (hereafter called a floppy) and the magnetic heads to contact each other only under the force of gimbal springs.

2. Description of the Prior Art

In floppy disk memory devices, as widely used with home computers and word processors, it is necessary to bring the magnetic read/write heads into contact with a thin magnetic coating on the circular Mylar disk at a predetermined pressure to avoid damage to the disk or heads.

FIGS. 1 and 2 show a conventional movable magnetic head assembly for floppy disk memories, wherein a floppy 1 comprises a thin disk 2 coated on both sides with a magnetic storage material 2a and enclosed in a jacket 3 having a head window opening 4 on both sides. Gimbal springs 6a and 6b centrally support magnetic heads 5a and 5b, respectively, and urge them against the disk 2 with an appropriate pressure. A loading arm 7 has a precision injection molded flexure spring 8 inserted in the one end thereof, and has a hollow pedestal surface for attaching the gimbal spring 6a at the other end. A carriage 9 is guided by a pair of parallel rods 10 for radial movement relative to the disk, and defines a pedestal 11 for mounting the spring 8. The heads 5a, 5b are connected to read/write signal cables 12a, 12b, respectively.

The mechanism by which the arm 7 is separated from the disk comprises a cross-arm 13 rigidly fixed to or formed integrally with the arm, and arranged to be physically engaged by hand or by any suitable mechanical or electromechanical arrangement capable of withdrawing the arm against the pressure of the spring 8 in a direction opposite that of arrow A.

A coil spring 14 is disposed between the arm 7 and a support arm 15 secured to the pedestal 11 over the spring 8 by screws 16 for urging the arm 7 toward the disk perpendicularly; this applies a predetermined "pinch" pressure between the disk 2 and the heads 5a, 5b.

In operation, the cross-arm 13 is first moved in the direction opposite arrow A to form an insertion gap for the jacket 3, which has a thickness of "h". After inserting the floppy 1 into the gap, the loading arm 7 is released and moves in the direction of arrow A to bring the heads 5a, 5b into contact to the magnetic material 2a of the disk.

In such a conventional head assembly, there are essentially four spring forces which affect the overall contact pressure between the disk and the heads; the force of the compressed coil spring 14, the force of the flexure spring 8, the inherent spring force of the head cable 12a, and finally the force of the gimbal springs 6a, 6b which support the magnetic heads. Differences in the head contact pressure thus arise due to gravitational forces exerted on the loading arm 7, etc. depending on the orientation of the floppy disk drive mechanism, i.e. horizontally as shown, horizontal but upside down, or vertical. Such contact pressure variations are typically compensated by adjusting the compression strength of the coil spring 14 via means not shown, which is obviously time consuming and troublesome.

Further, since the head cable 12a extends somewhat loosely between the movable arm 7 and the fixed carriage 9, the inherent elastic or spring force attributable to the cable varies widely and with use, which tends to disrupt any fine force adjustments made to the coil spring 14.

These unavoidable contact pressure variations attendant with the conventional magnetic head assembly result in damage to the disk and in unstable signal transducing characteristics.

SUMMARY OF THE INVENTION

It is an object of the present invention to avoid the aforementioned drawbacks of the prior art by providing a movable magnetic head assembly in which a desired contact pressure between the floppy and the magnetic heads is established and maintained only by means of the gimbal springs. Such object is realized by providing a constraining member on the fixed carriage pedestal or movable loading arm proximate the flexure spring, which limits the movement of the arm toward the disk to a predetermined value.

DETAILED DESCRIPTION OF THE PREFERRED EMBODIMENTS

Figure 1:
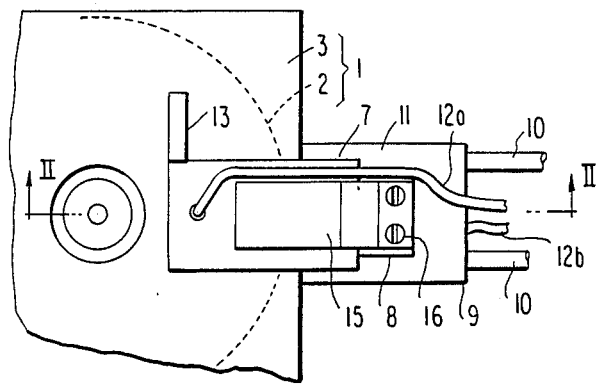
FIG. 1 is a plan view of a conventional movable magnetic head assembly.
Figure 2:
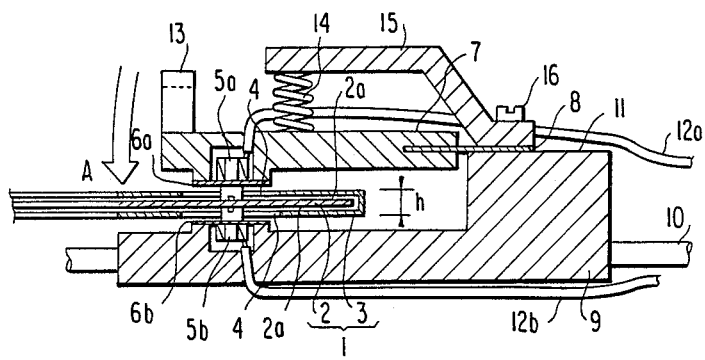
FIG. 2 is a longitudinal sectional view taken along the line II—II in FIG. 1.
Figure 3:
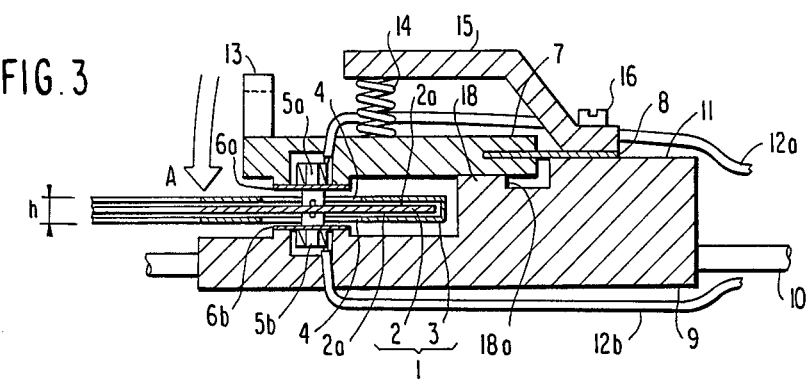
FIG. 3 is a longitudinal sectional view showing a first embodiment of this invention.

Referring now to FIG. 3, wherein the same reference numerals as used in FIGS. 1, 2 designate like structural elements, a constraining member or stop 18 in accordance with the invention comprises a projection on the carriage 9 extending toward the loading arm 7 at a position between the edge of the floppy 1 and the carriage pedestal 11. The stop has an upper abutment surface 18a which engages the lower surface of the loading arm when it moves in the direction of arrow A and restricts any further downward movement thereof. Such engagement effectively negates any biasing forces due to the springs 8, 14 and the cable 12a, whereby the operating contact pressure between magnetic heads 5a, 5b and the disk 2 is determined only by the deformation of the gimbal springs 6a, 6b.

In operation, for the insertion of the floppy 1 to its operating position, the cross-arm 13 is lifted or moved in the direction opposite arrow A by a distance only slightly exceeding the thickness "h" of the jacket 3 plus the amplitude of deformation of the gimbal springs. After insertion the arm 7 is returned in the direction of arrow A to permit the heads 5a, 5b to contact the disk surfaces. During such return movement the arm engages the abutment surface 18a of the constraining member 18, whereafter the contact pressure between the magnetic heads and the disk is established only by the gimbal springs. Such contact pressure is set, by appropriate selection of the gimbal spring paramaters, at a value which prevents the excessive wear of the disk coatings 2a and yet provides stable transducing characteristics, generally in the range of 18 to 22 grams.

Figure 4:
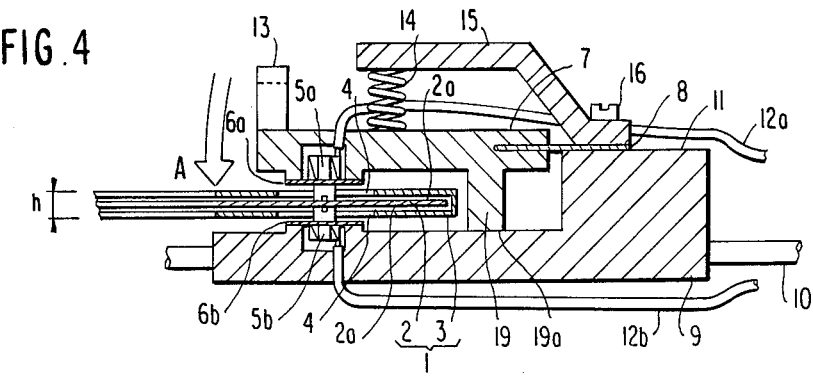
FIG. 4 is a longitudinal sectional view showing a second embodiment of this invention.

In the second embodiment illustrated in FIG. 4, a constraining member 19 is integral with and depends downwardly from the loading arm 7. Such arrangement provides the same effect as described above, with the bottom surface 19a of the constraining member restricting the further movement of the arm 7 in the direction of arrow A.

Figure 5:
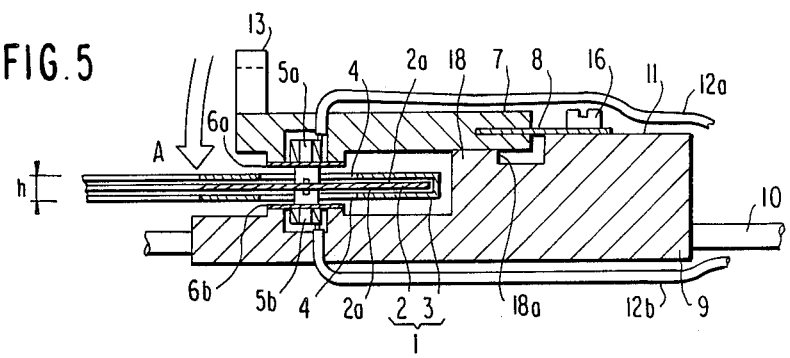
FIGS. 5 and 6 are respectively longitudinal sectional views of other embodiments of a movable magnetic head assembly according to the present invention.

A third embodiment of the invention is illustrated in FIG. 5, and is essentially the same as the first embodiment but with the coil spring 14 and the support arm 15 being eliminated.

Figure 6:
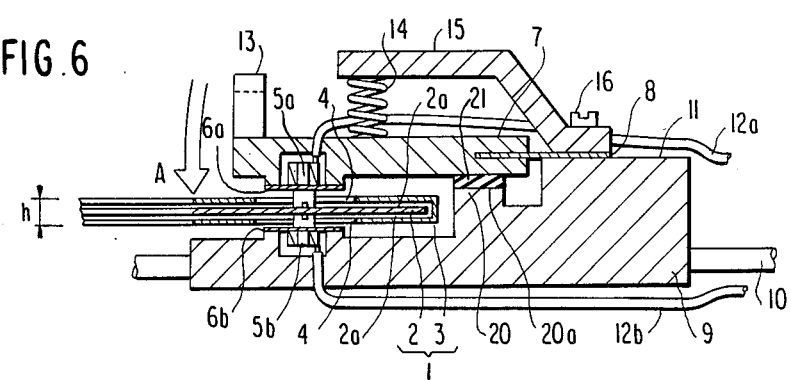

The fourth embodiment illustrated in FIG. 6 is again similar to the first embodiment, but a vibration damping pad 21 of rubber or the like is secured to the upper surface 20a of the constraining member 20 to soften the impact of the arm 7 against the carriage 9 and attendantly prevent damage to the disk 2 and the magnetic heads 5a, 5b.

What is claimed is:

1. A movable magnetic head assembly simultaneously cooperable with opposite sides of a magnetic storage disk (2), comprising:
   (a) an elongate carriage (9) radially movable relative to the disk and having a pedestal (11) upstanding from a radially outer end thereof,
   (b) an elongate loading arm (7) pivotally mounted to the pedestal, extending parallel to the carriage to define therewith a disk receiving slot, and radially movable with the carriage,
   (c) spring means (8) biasing the loading arm towards the carriage,
   (d) first and second signal transducer heads (5a, 5b) respectively mounted opposite and facing each other to radially inner portions of the carriage and loading arm by respective gimbal springs (6a, 6b), and
   (e) stop means (18; 19; 20) disposed intermediate the transducers and the pedestal and between said loading arm and said carriage at a position radially outwardly and spaced from an outer circumference of the disk for preventing the pivotal movement of the loading arm towards the carriage by the spring means beyond a predetermined position whereat the transducer heads pinchingly engage the opposite sides of the disk with a predetermined tracking force determined exclusively by the gimbal springs, said stop means defining an inner end of the disk receiving slot.

2. The assembly of claim 1, wherein the stop means (18; 20) comprises a projection upstanding from the carriage radially inwardly from the pedestal, the projection having a restricting surface which contacts a lower surface of the loading arm.

3. The assembly of claim 2, further comprising a vibration damping pad (21) provided on the restricting surface of the projection.

4. The assembly of claim 1, wherein the stop means (19) comprises a projection depending downwardly from the loading arm radially inwardly from the pedestal, the projection having a restricting surface which contacts an upper surface of the carriage.

* * * * *